(12) United States Patent
Bilodeau (10) Patent No.: US 7,205,737 B1
(45) Date of Patent: Apr. 17, 2007

(54) SYSTEMS AND METHODS OF MONITORING A MOTOR LOAD

(75) Inventor: Mark Bilodeau, Burlington, MA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/324,818

(22) Filed: Jan. 4, 2006

(51) Int. Cl.
H02K 17/32 (2006.01)

(52) U.S. Cl. .............. 318/434; 318/431; 318/432; 318/433; 388/800; 388/930

(58) Field of Classification Search ........... 318/434, 318/139, 430, 432, 433; 361/76; 324/86; 388/800, 138, 439, 254, 930
See application file for complete search history.

(56) References Cited

U.S. PATENT DOCUMENTS

| | | | |
|---|---|---|---|
| 3,585,451 A | 6/1971 | Day, III | |
| 3,942,111 A | 3/1976 | Pfouts | |
| 4,199,798 A * | 4/1980 | Leppke et al. ............. | 361/76 |
| 4,204,425 A | 5/1980 | Mallick, Jr. | |
| 4,292,574 A | 9/1981 | Sipin et al. | |
| 4,453,115 A | 6/1984 | Yoshida | |
| 4,473,856 A | 9/1984 | Takahashi et al. | |
| 4,670,698 A | 6/1987 | Fulton et al. | |
| 4,829,218 A | 5/1989 | Bauer | |
| 4,851,743 A | 7/1989 | Schmerda et al. | |
| 5,473,497 A | 12/1995 | Beatty | |
| 5,612,629 A | 3/1997 | Mullin et al. | |
| 5,652,525 A | 7/1997 | Mullin et al. | |
| 5,666,066 A | 9/1997 | Jo | |
| 5,811,946 A | 9/1998 | Mullin et al. | |
| 6,497,258 B1 * | 12/2002 | Flannery et al. ......... | 140/123.6 |
| 6,838,847 B2 | 1/2005 | Dragoi et al. | |

FOREIGN PATENT DOCUMENTS

EP  0 536 488  4/1993

* cited by examiner

Primary Examiner—Karen Masih
(74) Attorney, Agent, or Firm—Michael Best & Friedrich LLP (57) ABSTRACT

Systems and methods of detecting an overload condition. In one embodiment, a method of monitoring a load of a DC motor includes intermittently de-energizing the motor; monitoring a first voltage; and measuring a first interval of time between a starting time and an ending time, wherein the starting time comprises the time at which the motor is de-energized and the ending time comprises a time at which the first voltage and a reference voltage have substantially similar values.

35 Claims, 10 Drawing Sheets

SYSTEMS AND METHODS OF MONITORING A MOTOR LOAD

FIELD

Embodiments of the invention relate to direct-current ("DC") motors. More specifically, embodiments of the invention relate to detection of a DC motor overload condition.

BACKGROUND

As the loading of a DC motor increases, the current draw and internal heat dissipation of the motor also increase. Concurrently, its speed, and the amount of cooling air provided by an internal or external fan turning at motor speed, decreases. Accordingly, the temperature of the motor increases. Because temperature affects both the performance and the durability of a motor, motors are designed to operate within carefully defined loading limits. In service, however, unforeseen circumstances may cause the loading of a motor to exceed the design values, and as a result motor temperature may exceed the acceptable limit. Sometimes this results in motor failure. In extreme cases, combustion of one or more materials within the motor occurs.

An example of an application where motor overload can be a problem is that of automotive engine-cooling. Many automotive vehicles use an electric fan assembly to move air through a radiator, condenser, or other heat exchanger. Typically, a DC motor powers such an assembly. The presence of snow, ice, or mud can increase the torque required to turn the fan, or in extreme cases prevent the fan from turning at all. A failed motor bearing can likewise retard or prevent rotation. These situations can result in a failed motor. Occasionally, they can result in an under-hood fire. It is, therefore, desirable to detect an overload condition before it results in excessively high motor temperatures.

Overload detection typically involves repetitively monitoring the motor load while the motor is in use. Traditional methods of monitoring a motor load include measuring the current drawn by the motor, the motor temperature, the speed of the motor, or the back-electromotive force ("back-EMF") generated by the motor.

Measuring back-EMF involves the intermittent de-energizing of the motor, and the measurement of the voltage of the disconnected or de-energized motor lead after sufficient time has passed for the currents in the motor to decay to zero, but before the motor has decelerated appreciably. This voltage is an indication of the back-EMF, which increases with motor speed. If the back-EMF is sufficiently low, an overload condition is indicated, and the motor can be shut down. If the back-EMF is sufficiently high, normal operation is indicated, and the circuit can be re-energized.

However, a disadvantage of current back-EMF measurement methods used to determine if an overload condition exists is the time required to make the measurement. After the motor is de-energized, some time is required for the measured voltage to approach the asymptotic value indicative of the back-EMF. This is compounded by the fact that the measurement is an inherently noisy one. The voltage of the disconnected motor lead will have a voltage ripple at the commutation frequency as well as random noise. Both of these components will vary as the condition of the brushes and commutator change over the life of the motor. To remove their effect on the voltage measurement, the signal can be filtered with a time constant equal to several commutation periods. This increases the length of time necessary to make an accurate back-EMF measurement, and the length of time that the motor is de-energized. If the de-energized periods are long enough, they can become acoustically perceptible, and can cause increased wear due to backlash between the motor shaft and the driven load. Thus, improved methods and devices of monitoring motor load are desired.

SUMMARY

The following summary sets forth certain example embodiments of the invention. It does not set forth all such embodiments and should in no way be construed as limiting of the invention.

In one embodiment, a method of monitoring a load of a DC motor includes intermittently de-energizing the motor; monitoring a first voltage; and measuring a first interval of time between a starting time and an ending time, wherein the starting time comprises the time at which the motor is de-energized and the ending time comprises a time at which the first voltage and a reference voltage have substantially similar values.

Another embodiment provides a motor load monitoring system configured to monitor a DC motor having a first motor lead and a second motor lead. The first and second motor leads are configured to be coupled to a power or voltage supply. The system includes a switch configured to be coupled between the power supply and the first motor lead; a fly-back current path between the first motor lead and the second motor lead; and a controller configured to be coupled to the switch. A freewheeling diode, switch, or other device prevents current from flowing through the fly-back path when the motor is energized. The controller intermittently de-energizes the motor by controlling the switch and receives a monitored voltage. The controller is configured to measure a first interval of time between a starting time and an ending time, wherein the starting time comprises a time at which the motor is de-energized and the ending time comprises a time at which the monitored voltage passes through a reference voltage.

Another embodiment provides an automotive engine-cooling motor system comprising a motor having a first motor lead and a second motor lead. The first and second motor leads are configured to be coupled to a power supply. The system includes a switch configured to be coupled between the power supply and the first motor lead; a fly-back current path between the first motor lead and the second motor lead; and a controller configured to be coupled to the switch. The controller intermittently de-energizes the motor by controlling the switch, receives a monitored voltage, and measures a first interval of time between a starting time and an ending time, wherein the starting time comprises a time at which the motor is de-energized and the ending time comprises a time at which the monitored voltage passes through a reference voltage.

Other aspects of embodiments of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
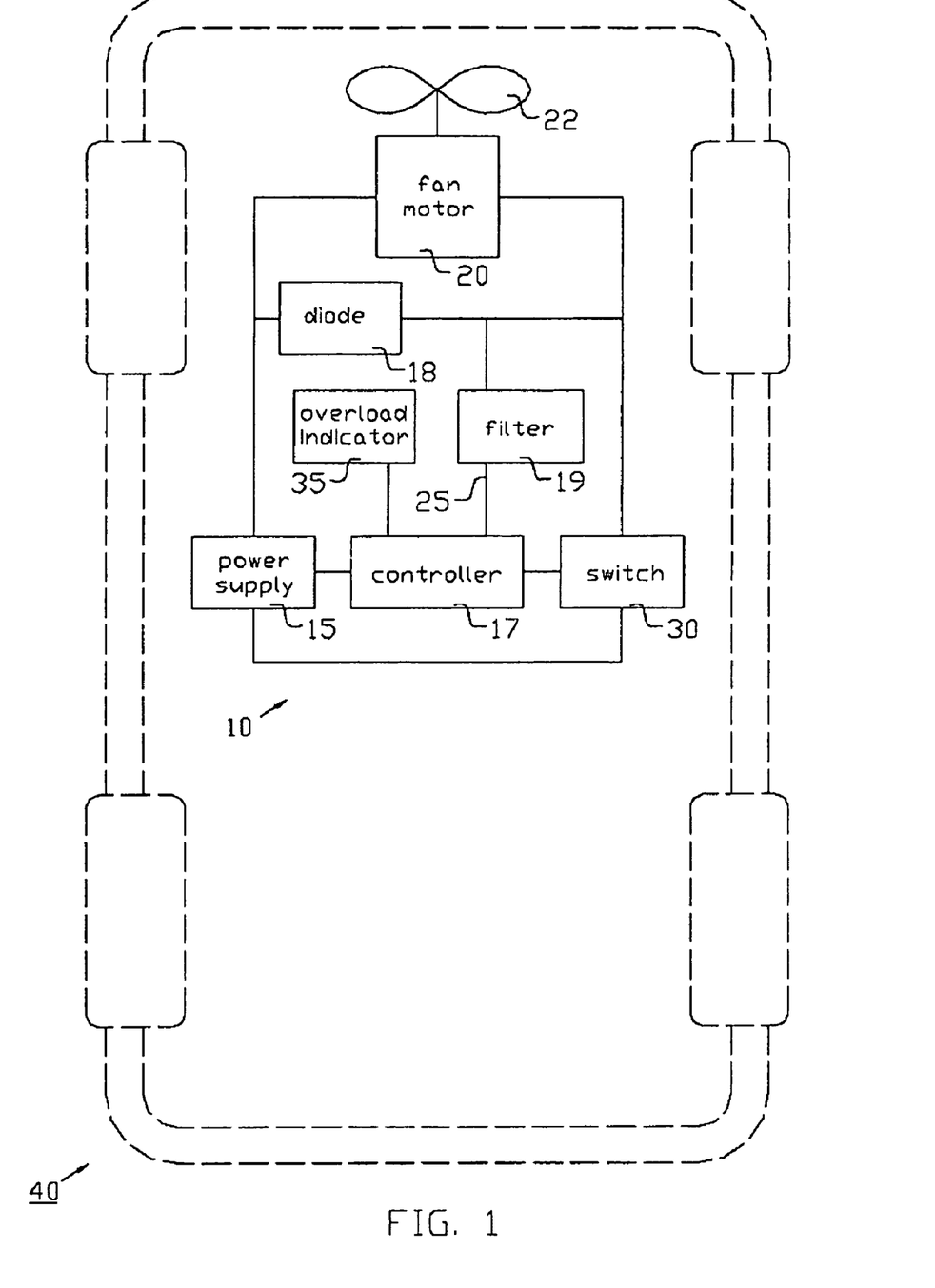
FIG. 1 illustrates an automobile with a cooling fan and an exemplary motor overload detection system.

FIG. 1 illustrates an embodiment of a motor overload detection system 10. The motor overload detection system 10 includes a power supply 15 (such as a vehicle battery), a motor 20, a switching device or switch 30, a fly-back current path containing a diode 18 or similar device, a controller 17, a filter 19, and an overload indicator 35. The motor is connected to a fan 22, which may be used, for example, to direct air to a radiator (not shown). The controller receives a monitored voltage 25 as input. The system 10 has particular usefulness in automobiles (such as automobile 40 (shown schematically)), but can be used in other applications where motor overload is of concern.

The controller 17 transmits signals to the switch 30 and the overload indicator 35. The controller 17 detects the presence of an overload condition by signaling the switch to interrupt the current provided by the power supply, and then comparing the monitored voltage 25 to a voltage from a reference (which in one embodiment is the voltage of the power supply 15), as described in greater detail with reference to FIG. 2.

In the event that an overload condition does not exist, the controller signals the switch to close, thereby re-energizing the motor. If an overload condition does exist, the controller takes appropriate action. In some embodiments, the controller waits a period of time before signaling the switch to close and thereby re-energize the motor. In other embodiments, the controller does not re-energize the motor. In some embodiments, the controller signals the overload indicator 35 to provide an audio, visual, or other indication of the overload condition. For example, the overload indicator 35 can be a flashing light, a warning sound, a fault message, or a combination thereof. Other overload indicators 35 are also possible. In some embodiments, a combination of these actions is performed.

In some embodiments, the controller 17 initiates an overload detection cycle (i.e., the voltage comparison described above) in regular intervals. The length of those intervals can vary depending on the motor and the application. Generally, the thermal capacity of a motor is large enough to delay damage associated with an overload condition for only a short period of time. Therefore, such a condition, if it exists, must be detected within that period of time, and the motor de-energized. Factors which may influence the choice of load-monitoring frequency may include the design load of the motor, the amount of motor cooling provided, the thermal capacity of the motor, and the ambient temperature. For example, a motor with a heavy load operating at high ambient temperature may require a more frequent overload detection to ensure the motor stays within the proper operating range. Likewise, a motor with a relatively light load operating at low temperature may only require occasional overload detection or monitoring.

Referring still to FIG. 1, the controller 17 can be used to control the overload detection cycle described above. The controller 17 may be a processor that executes computer executable programs (i.e., software) with the aid of an operating system (not illustrated). In other embodiments, the controller 17 may comprise hardware, such that functions described herein are performed by hardware components. For example, the controller 17 may be implemented by an application-specific, integrated circuit ("ASIC"), firmware, dedicated components, or the like, as are known in the art. Thus, it will be appreciated that the controller 17 may be implemented in hardware, software, or a combination of the same.

Figure 2:
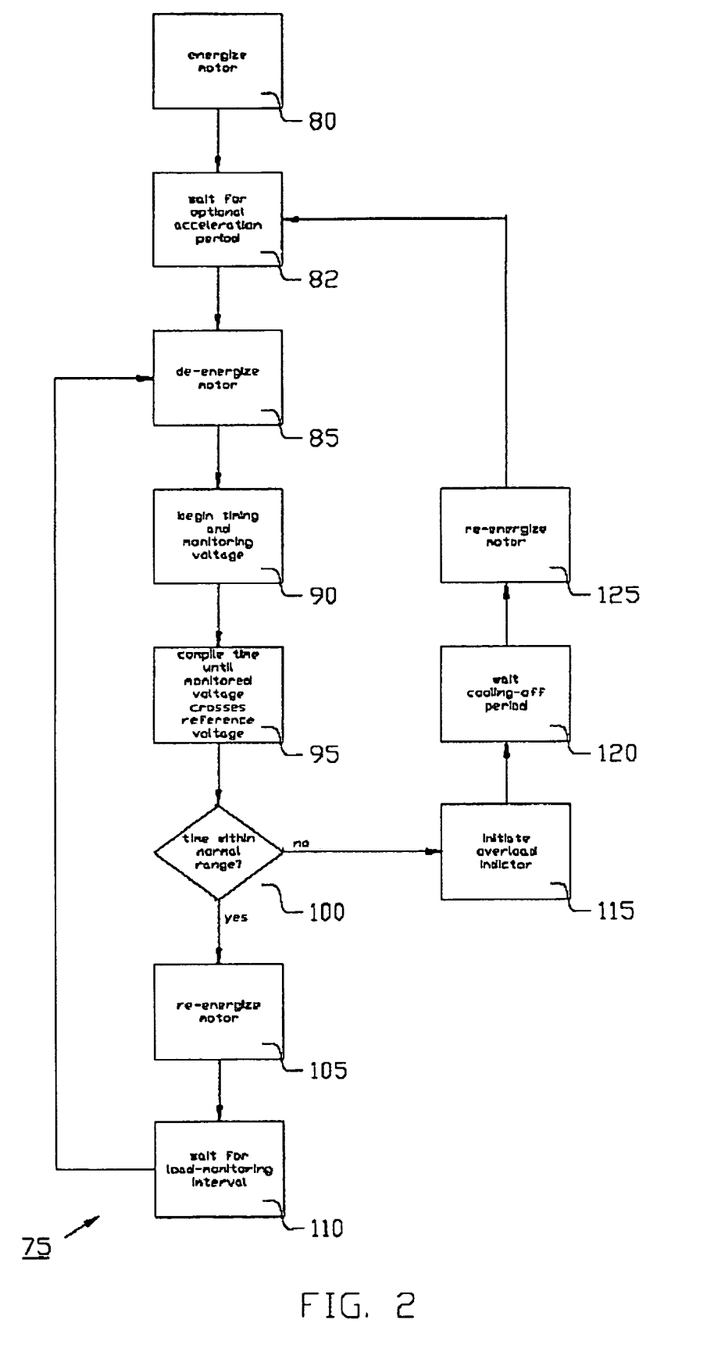
FIG. 2 illustrates an exemplary process that can be used to detect a motor overload condition.

FIG. 2 illustrates a process 75 that can be implemented by the controller 17 to detect an overload condition. The motor is first energized at step 80. In some embodiments, overload detection is not performed during the motor's normal start-up period. During this period the acceleration of the motor and the driven components, such as a fan, will temporarily increase the load on the motor beyond the design load. Delaying the first load-monitoring event (step 82) will assure that this temporary load is not interpreted as an overload situation. The acceleration period should be long enough to allow the motor to reach a substantially steady speed, but shorter than the time it takes for the motor to be damaged if an overload condition were to exist. In some embodiments the acceleration period is shorter than the interval between overload detection cycles while the motor is energized.

Figure 3:
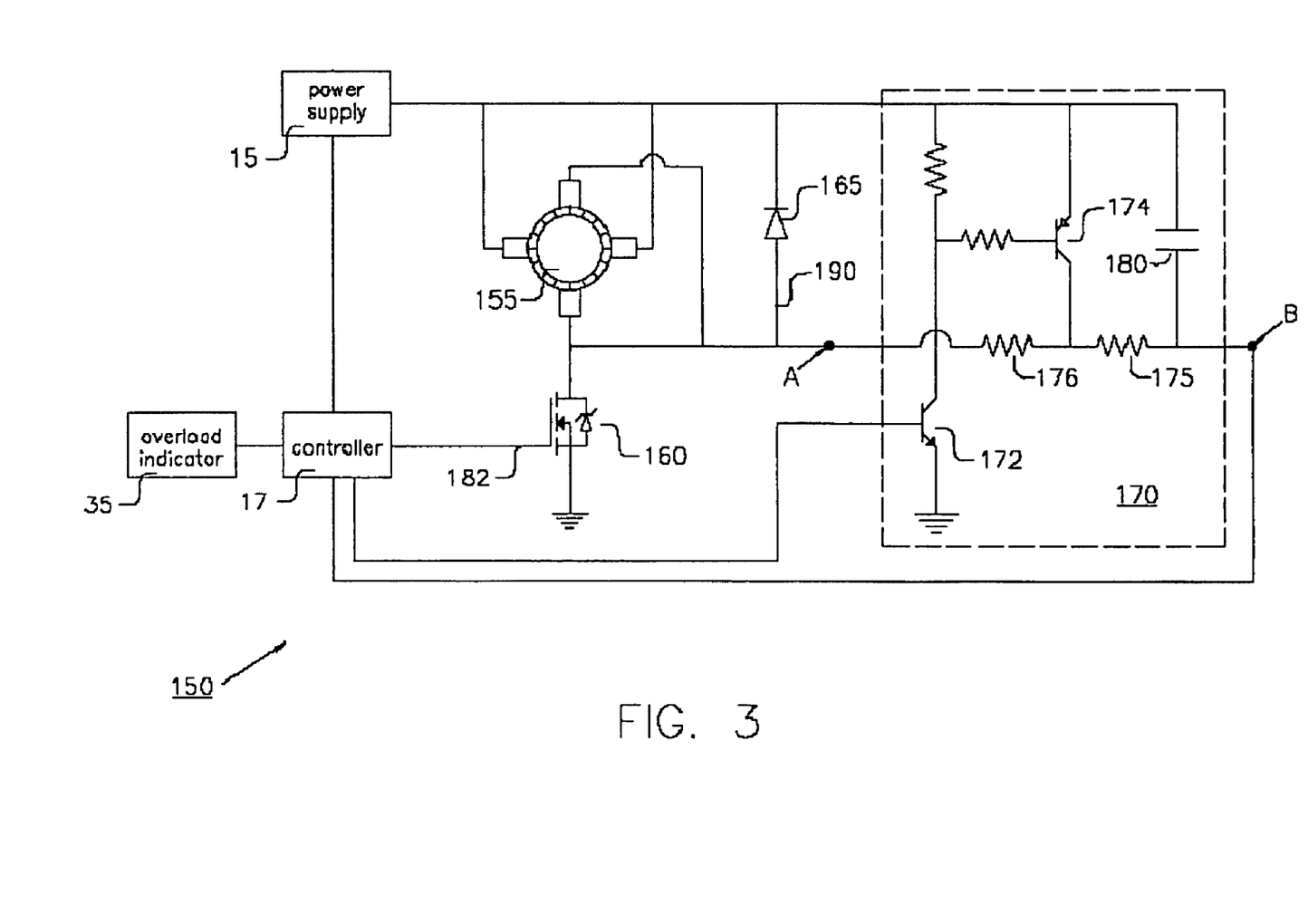
FIG. 3 illustrates an exemplary motor overload detection system that includes a field effect transistor positioned on a low-voltage side of a motor.

After the waiting or acceleration period is complete, the switch 30 is used to interrupt the current that is supplied to the motor by the power supply 15 (step 85). That is, the motor is de-energized. In some embodiments, a transistor (as shown in FIG. 3) is used as the switch 30. Deactivating the switch 30 causes the controller 17 to begin timing a comparison between a reference voltage and the monitored voltage 25 (step 90). In some embodiments, the timing function and voltage comparison function are carried out by the controller 17, as illustrated in the embodiment of FIG. 3. In other embodiments, the timing function and voltage comparison function are carried out by other electronic hardware components. For example, the voltage comparison function can be completed using a transistor-based or an operational-amplifier ("op amp") based comparison circuit, which is known in the art.

The voltage comparison is continued, and the comparison time is compiled until the monitored voltage 25 and the reference voltage are approximately equal (step 95). As described in greater detail with respect to FIGS. 4B and 6B, the monitored voltage is initially maintained within a fraction of a volt of the voltage of the non-switched motor lead. When the current through the motor decays to zero, the monitored voltage passes through the voltage of the non-switched lead, and eventually differs from it by an amount equal to the back-EMF voltage. The back-EMF voltage is produced by a continued rotation of the motor after the motor is de-energized. In some embodiments, the reference voltage is taken to be equal to the voltage of the non-switched motor lead. After detecting an approximate equality between the monitored voltage 25 and the reference voltage, the time compilation is stopped, measured, and categorized (step 95). Time categories can include, for example, an underload category, a normal category, and an overload category, wherein each time category is defined by a certain span of time. For example, a motor load can be categorized as operating normally if the time required for the monitored voltage 25 to fall to a value that is approximately equal to the reference voltage is included in the normal time category.

In one embodiment, the categorized time periods are initially determined using known motor characteristics. For example, if a motor is operating at the design voltage, speed, and torque, the monitored voltage will cross the reference voltage within a predictable length of time. If the motor is overloaded, and running at higher torque and lower speed, the voltage will cross the reference voltage after a longer time. A reference time can be established which represents the minimum time considered to be an overload condition. In some embodiments, different levels of overload can be defined, and different reference times established to delineate them. If the motor operates at selectable or variable voltages, the reference times may differ according to the voltage. Similarly the ambient temperature may affect the reference times. Reference times that correspond to each condition can be compiled for each application. Additionally, times that correspond to each category can be defined for different motors. For example, a 200 Watt motor will have normal and overload time periods that differ from those of a 400 Watt motor. In some embodiments, the controller 17 can be used to store each defined reference time. For example, in one embodiment, the controller 17 can include a look-up table ("LUT") of reference time periods that correspond to each defined operating condition (e.g., normal, overload, etc.).

If the measured time period is within the normal time range (step 100), the switch 30 is re-energized (step 105). The process then goes to step 110, and waits for a predetermined amount of time prior to de-energizing the switch 30 (step 85), thereby initializing the overload detection cycle again. This period of time should be short enough to detect an overload condition before that condition results in irreversible or permanent damage to the motor and associated devices (such as a fan, control electronics, etc.).

If the measured time period is not within the normal operating condition category, an overload condition can be identified. In some embodiments, a signal is then sent to an overload indicator 35 (step 115). In some embodiments, if an overload condition is recognized, the motor remains de-energized for a certain amount of time (step 120). This period of time allows the motor to cool and may be sufficient for the cause of the overload condition to be removed. For example, in some embodiments, the cause of the overload condition might be the accretion of ice on an automotive fan assembly during winter conditions, and the time that the motor is de-energized may be sufficient for the ice to be melted by the heat of the vehicle's engine. After the cooling period has expired, the switch 30 returns to the conductive state (step 125) and the motor is re-energized. The process then waits for sufficient time for the motor to accelerate (step 82) before the next load-monitoring cycle begins. In order that the motor remain sufficiently cool if the overload condition persists, the cooling period, in some embodiments, can be greater than five times longer than the acceleration period noted above.

In other embodiments, if an overload condition is recognized, the switch 30 remains in the non-conductive state and the motor remains de-energized. In still other embodiments, the overload category can include several levels, with each level indicating a different degree of overload severity that requires a different action. One category may call for a cooling-off period, followed by a re-energizing of the motor, while other categories may call for the motor to remain de-energized.

In some embodiments, the speed of the motor can be controlled. In some embodiments, this can be done by pulse-width modulation. In some embodiments, the switch 30 used for overload detection is also used for pulse-width modulation, selective brush powering, or other speed-control purposes.

FIG. 3 is a schematic representation of one embodiment of a motor overload detection system 150. The motor overload detection system 150 includes a motor 155, the power supply 15, an N-channel field effect transistor ("FET") 160, a freewheeling (or "fly-back") diode 165, a filter 170, the controller 17, and the overload indicator 35. In other embodiments, as previously described, the motor overload detection system 150 could have more or fewer elements than those shown in FIG. 3. For example, the motor overload detection system 150 could include additional hardware (e.g., a comparison circuit, a timing circuit, and the like) that perform functions similar to those of the controller 17. Therefore, in such embodiments, the controller 17 may be omitted from the detection system 150.

In some embodiments, the motor 155 is a brushed DC motor having four poles. However, other types of motors (e.g., a brushless DC motor) and motors having other numbers of poles can be used. In some embodiments, the circuit shown in FIG. 3 is used to power a motor in one direction only. In other embodiments, the circuit shown in FIG. 3 is part of a "full-bridge" circuit which can power a motor in different rotational directions.

Figure 3B:
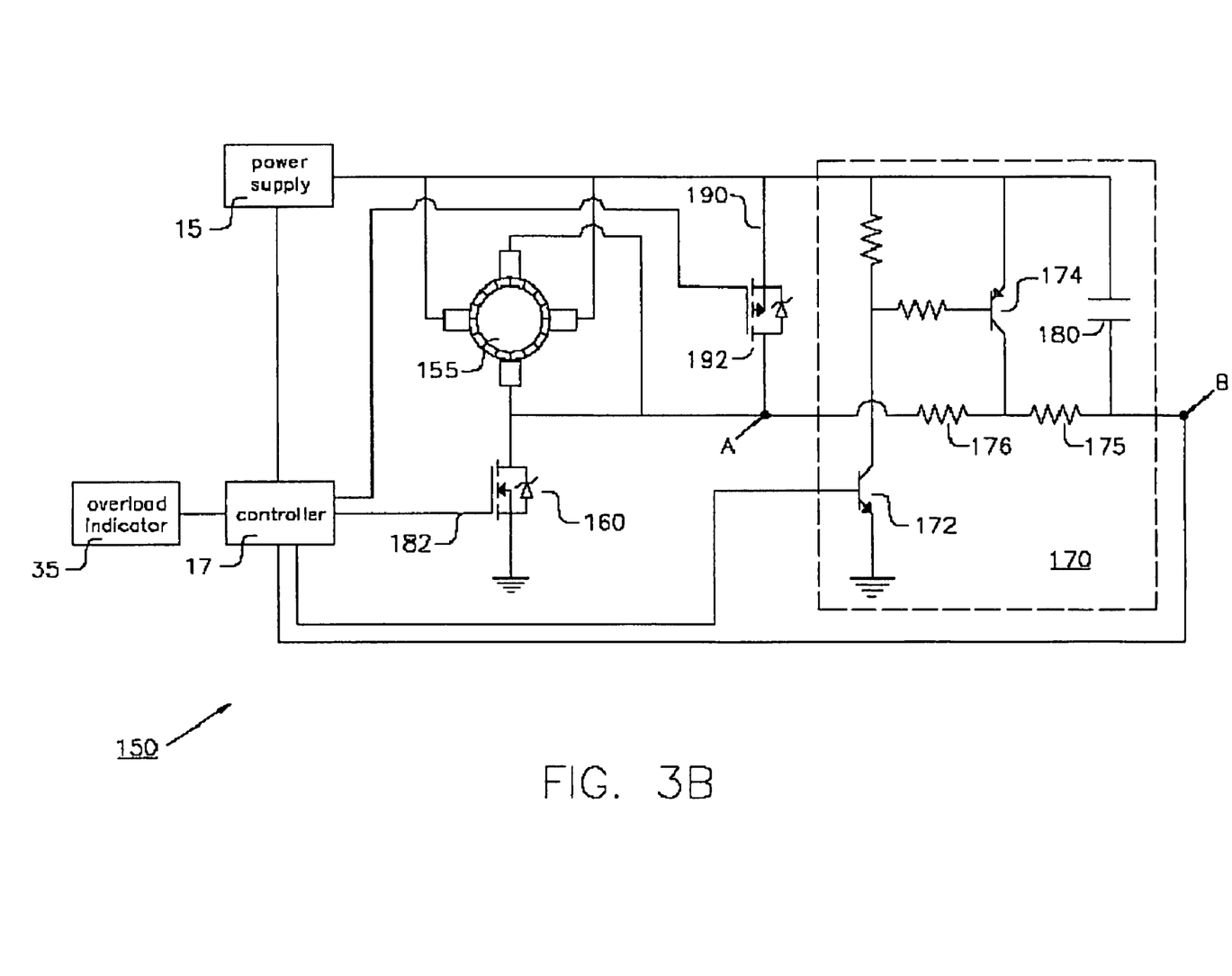
FIG. 3B illustrates another exemplary motor overload detection system.

In some embodiments, the current in a fly-back path 190 is controlled by a freewheeling diode 165, as shown in FIG. 3. In other embodiments, however, as shown in FIG. 3B, the fly-back current path 190 is controlled by other devices. For example, if the FET 160 is used for PWM speed control, the fly-back current path 190 is sometimes controlled by a switched FET 192. For example, when the FET 160 is switched off (i.e., is in a non-conductive state) FET 192 is switched on to allow current to flow through the fly-back current path 190 Such a FET 192 can have reduced losses compared to the diode 165.

The controller 17 supplies a voltage to a gate 182 of the FET 160. When an appropriate voltage is supplied to the gate 182, the FET 160 is switched on (i.e., is in a conductive state), allowing current to flow to ground and energize the motor 155. To detect a motor overload condition, the controller 17 applies a different, relatively lower voltage to the gate 182 of the FET 160, causing the FET 160 to switch off, and monitors either the voltage at node A, or a filtered voltage at node B. When the FET 160 turns off (i.e., switches to a non-conductive state), the current from the power supply 15 is interrupted. However, the diode 165 allows current to continue to flow through the motor 155. There continues to be a back-EMF voltage because the motor continues to turn and there continues to be a voltage drop through the motor resistance due to the current flow. Countering these voltage drops, however, is a voltage induced by the motor inductance which is proportional to the rate of change of current in the motor windings. When the FET 160 switches off, the voltage measured at node A increases to a value that is approximately equal to the combination of the supply voltage and a forward voltage drop associated with the diode 165 (i.e., approximately the combination of the supply voltage and 0.7 volts). This "diode-clamped" voltage can be measured until the current stops running through the diode 165. When the current stops, the voltage at node A falls to a level that differs from the supply voltage by approximately the back-EMF of the motor.

In those embodiments where a different device, such as a switched FET, serves the purpose of the diode shown in FIG. 3, the clamped voltage will differ from the supply voltage by an amount which differs from the approximately 0.7 volt forward voltage drop of a diode. For example, a switched FET may have a resistance of a few milliohms, resulting in a voltage drop considerably less than 0.7 volts.

In some embodiments, the controller 17 monitors the unfiltered voltage at node A. This node corresponds to the motor lead which is disconnected when the FET 160 is switched off. However, the signal at node A may be somewhat noisy. Therefore, the signal is preferably filtered before being measured. In some embodiments, the filter is similar to that shown as filter 170 in FIG. 3. The filtered signal may be measured at the output of filter 170 at node B.

The filter 170 is a resistance-capacitance ("R-C") filter which is initialized at approximately the supply voltage before the voltage at Node B is monitored. When the motor is energized, the controller 17 applies a voltage to a base of a transistor 172, and the transistor 172 is conducting, and a base of a transistor 174 is brought to ground. This allows current to flow through the transistor 174, and a capacitor 180 will be in a discharged state. When the motor 155 is de-energized, the controller 17 brings the base of the transistor 172 to ground, and the transistor 172 stops conducting. The voltage at the base of the transistor 174 increases to the supply voltage and the transistor 174 stops conducting. At this time, the filter acts as a simple R-C filter, with a total resistance equal to the sum of resistors 175 and 176. The time constant of this circuit is preferably smaller than a L/R inductive time constant of the motor. For example, "L" represents the inductance of the motor 155 and "R" represents the resistance of the motor 155 and fly-back circuit. In some embodiments, the time constant is less than one tenth of the L/R time constant of the motor.

Figure 4A:
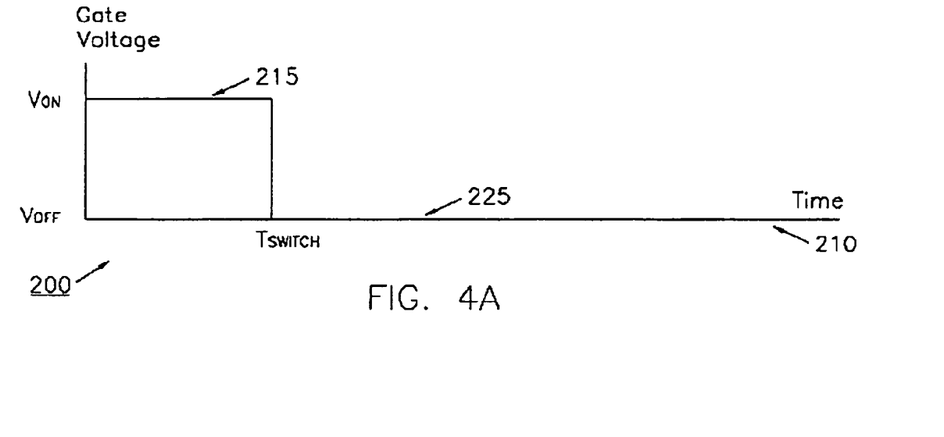
FIG. 4A illustrates a plot of voltage over time at a gate of the field effect transistor shown in FIG. 3 during a single de-energizing event.
Figure 4B:
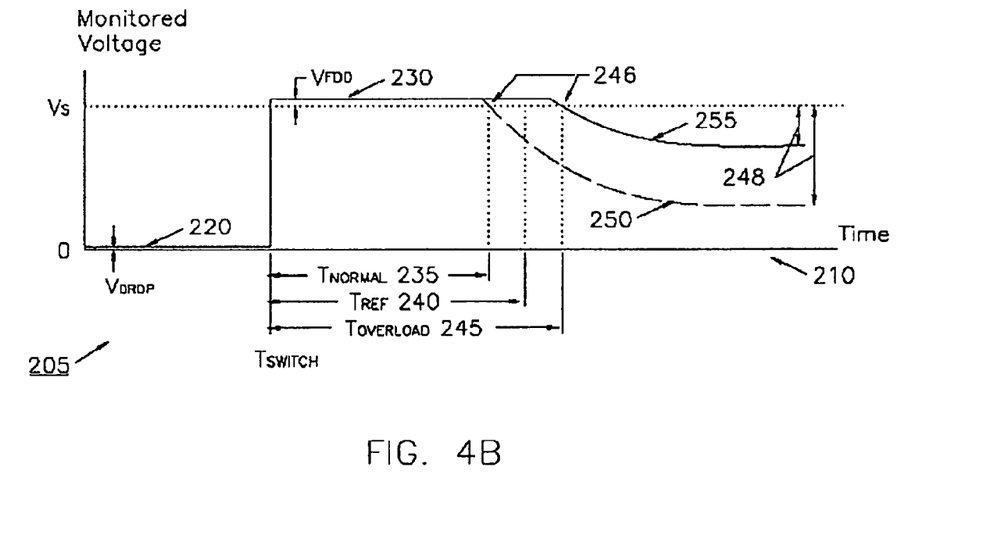
FIG. 4B illustrates a plot of voltage over time at a monitoring point "A" shown in FIG. 3 during a single de-energizing event.

FIGS. 4A and 4B illustrate exemplary voltage characteristic plots (200 and 205, respectively) of the motor overload detection circuit 150 (FIG. 3). FIG. 4A illustrates a voltage measurement at the gate of the FET 160 over a certain time period 210, while FIG. 4B illustrates a voltage measurement at node A over the same time period 210. This time period 210 corresponds to the time before and after a single de-energizing of the motor. As previously described, when a first voltage 215 is applied to the gate of the FET 160 (e.g., $V_{ON}$), the FET 160 conducts and the motor 155 is energized. Accordingly, as shown in FIG. 4B, motor current flows to ground, and a voltage measured at node A differs from ground by only a fraction of a volt (trace 220) (i.e., the voltage at node A is almost zero). The difference between the voltage measured at node A and ground is the relatively small voltage ($V_{DROP}$) associated with the resistance of the FET, which in some cases is a few milliohms.

Referring back to FIG. 4A, a second voltage 225 (e.g., $V_{OFF}$) is applied to the gate of the FET 160 at time $T_{SWITCH}$. At this time, the FET 160 turns off, effectively de-energizing the motor 155. At the time $T_{SWITCH}$ that the second voltage 225 is applied to the gate of the FET 160, the voltage measured at node A increases to a diode-clamped voltage 230, which, as previously described, is approximately equal to a combination of the supply voltage ($V_S$) and the forward voltage drop of the diode ($V_{FDD}$), as shown in FIG. 4B.

The current which flows through the diode after the motor is de-energized decays eventually to zero. When there is no longer current flowing through the diode 165, the voltage measured at node A begins to descend from the diode-clamped voltage value 230. Accordingly, the time required for the voltage to begin to descend from the diode-clamped value 230 varies according to the motor load. For example, a relatively large motor load inherently requires a large current to be present in the motor 155. Correspondingly, a longer time period is needed for the voltage to depart from the diode-clamped voltage 230, because motor current flows through the diode 165 for a longer period of time. Likewise, a relatively smaller load requires a shorter time period for the voltage to depart from the diode-clamped voltage 230. Therefore, a longer time period can indicate an overload condition.

FIG. 4B shows three time periods, including ($T_{NORMAL}$) 235, ($T_{REF}$) 240, and ($T_{OVERLOAD}$) 245, which correspond to a normal time period, a reference time period, and an overload time period. The time periods 235–245 are representative of the time that is required for the voltage measured at node A to begin to descend from the diode-clamped voltage 230 and reach a reference voltage, which in the case shown is the supply voltage level ($V_S$) (shown by arrows 246). Dashed line 250 illustrates a motor that is operating within normal loading parameters, which requires a first or normal time period ($T_{NORMAL}$) 235 for the monitored voltage 230 to descend to the supply voltage level ($V_S$). A motor that is overloaded, on the other hand, requires a relatively longer period of time ($T_{OVERLOAD}$) 245 for the monitored voltage 230 to descend to the supply voltage level ($V_S$), as shown with solid line 255. The reference time period ($T_{REF}$) 240 can correspond to, for example, the limiting criterion for determining if the motor is in an overload condition.

The reference voltage in the embodiment described in FIG. 4B is the supply voltage $V_S$. The supply voltage is the voltage of the un-switched motor lead. In other embodiments, the reference voltage differs from that of the un-switched motor lead. For example, if the comparison circuit consists of a simple transistor, the monitored voltage in FIG. 4B might be compared to a reference voltage equal to the supply voltage minus a diode voltage drop.

The monitored voltage 230 eventually levels off at a level equal to the supply voltage $V_S$ minus the back-EMF value 248. A prior-art method of overload detection consists of measuring this back-EMF voltage 248 and from that measurement inferring the speed and loading of the motor. However, the amount of time required for the monitored voltage to reach a level indicative of the back-EMF is generally significantly longer than that required to determine the motor load using the present method. Using the present method, the length of time that the motor is de-energized under normal loading conditions is $T_{NORMAL}$. A back-EMF measurement would require a length of time equal to $T_{REF}$ plus the additional length of time required for the voltage to attain the asymptotic value associated with the back-EMF. Even with an ideal voltage trace, this time would exceed $T_{NORMAL}$. However, the voltage trace of an open-circuited brushed DC motor is, unlike the ideal trace shown in FIG. 4B, a fairly noisy signal. The measurement of back-EMF under these conditions is intrinsically less precise than the timing of crossing of the reference voltage required by the current invention. This limitation can only be eliminated by filtering the monitored voltage with a time constant several times longer than the inverse of the motor's commutation frequency. This time constant is generally significantly longer than that of the filter 170. This filtering would further add to the time required to make a back-EMF measurement.

The voltage trace shown in FIG. 4B corresponds to the voltage monitored at node A. If filter 170 is used, the voltage monitored at node B will differ from that of FIG. 4B during the time preceding $T_{SWITCH}$, when it will be equal to the supply voltage $V_S$, minus a small transistor voltage drop. After $T_{SWITCH}$, it will approximate that shown in FIG. 4B.

The voltage traces shown in FIGS. 4A and 4B correspond to a single de-energizing event, showing the behavior of the gate voltage of the FET 160 and the monitored voltage 230 in the event that the motor is not re-energized. The solid line 255, shown in FIG. 4B corresponds to the actual voltage trace for a motor in an overload condition, since a motor in this condition would in most embodiments not be re-energized. Not shown in FIG. 4B is the eventual change in back-EMF voltage as the motor speed changes. As the motor slows, and eventually stops, the back-EMF value 248 will fall to zero, and the solid trace will gradually approach the supply voltage $V_S$.

Figure 4C:
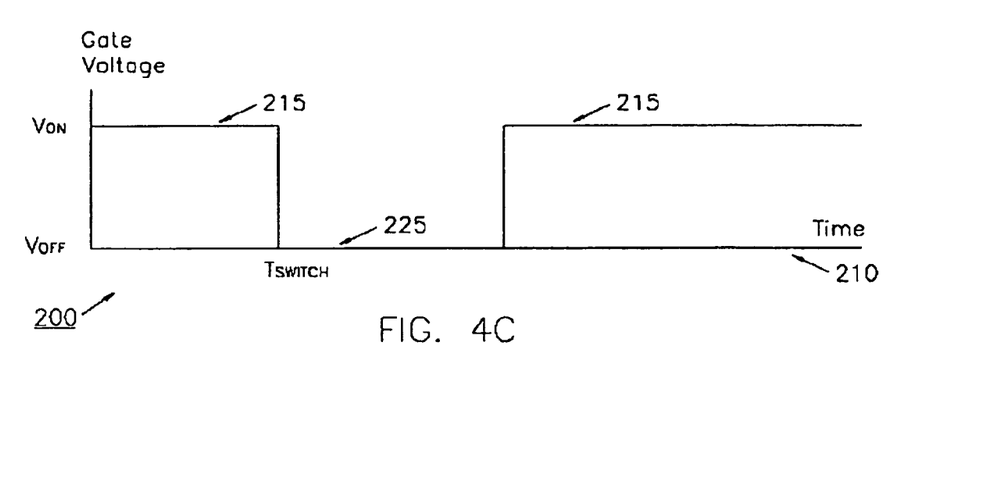
FIG. 4C illustrates a plot of voltage over time at the gate of the field effect transistor shown in FIG. 3 during a de-energizing and re-energizing of the motor in a case of normal loading.
Figure 4D:
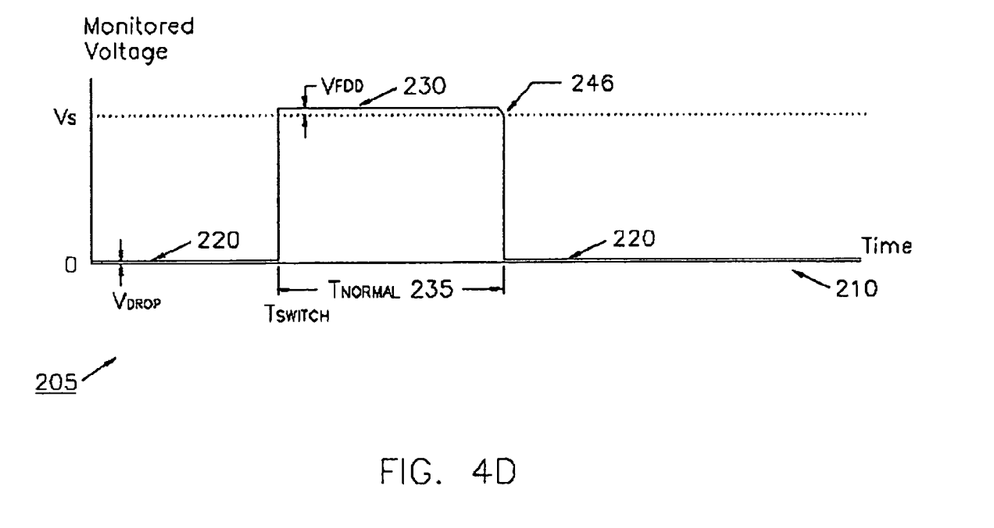
FIG. 4D illustrates a plot of voltage over time at the monitoring point "A" shown in FIG. 3 during a de-energizing and re-energizing of the motor in the case of normal loading.

FIGS. 4C and 4D show the traces of gate voltage and monitored voltage 230 for a motor under normal loading conditions, including both the de-energizing event shown in FIGS. 4A and 4B, and a re-energizing event. When the controller 17 detects that the monitored voltage 230 crosses the reference voltage (in this example equal to the supply voltage $V_S$) within a time $T_{NORMAL}$ which is less than the reference time $T_{REF}$, as shown by the dashed curve in FIG. 4B, it determines that the motor is in a normal loading condition, and it therefore re-energizes the motor. To do this it applies voltage $V_{ON}$ to the gate of the FET 160, and the FET is returned to the conducting state. The monitored voltage 230 again falls to a small value $V_{DROP}$ corresponding to the resistance of the FET. This sequence of events, consisting of a de-energizing of the motor, a monitoring of the voltage at node A, a timing of the crossing of this voltage and a reference voltage, and a re-energizing of the motor, will be repeated at regular intervals as long as the motor is found to be in a normal loading condition.

In the embodiments shown in FIGS. 3, 4A and 4B, the FET 160 is used to switch the low-voltage lead of the motor 155. In the embodiments shown in FIGS. 5, 6A and 6B the FET 160 switches the high-side lead.

Figure 5:
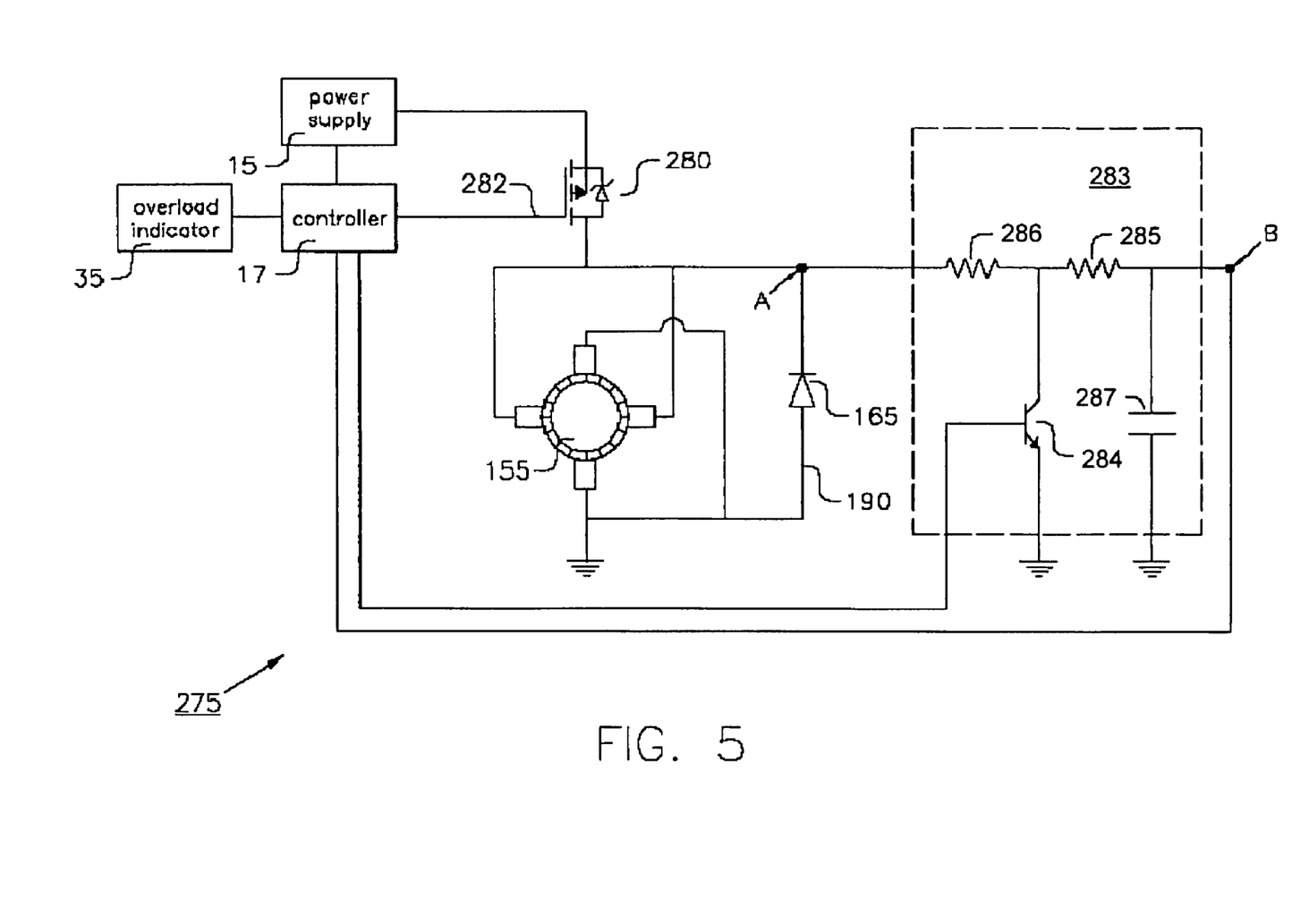
FIG. 5 illustrates another exemplary motor overload detection system that includes a field effect transistor positioned on a high-voltage side of a motor.

FIG. 5 is a schematic representation of a motor overload detection system 275 which includes the motor 155, the power supply 15, a p-channel FET 280, a freewheeling (or "fly-back") diode 165, a filter 283, the controller 17, and the overload indicator 35.

As shown in FIG. 5, the controller 17 supplies a voltage to a gate 282 of the FET 280. When an appropriate voltage is supplied to the gate 282, the FET 280 conducts or switches on (i.e., is in a conductive state), allowing current to flow from the power supply 15 to the high-voltage lead of motor 155. To detect a motor overload condition, the controller 17 increases the voltage at the gate 282 of the FET 280 and monitors either the voltage at node A or a filtered voltage at node B. The FET 280 turns off (i.e., is in a non-conductive state), thereby interrupting the current from the power supply 15. However, diode 165 allows current to continue to flow through the motor 155. There continues to be a back-EMF voltage because the motor continues to turn, and there continues to be a voltage drop through the motor resistance due to the current flow. Countering these voltage drops, however, is a voltage induced by the motor inductance which is proportional to the rate of change of current in the motor windings. When the FET 280 switches off, the voltage measured at node A decreases to a value that is approximately equal to the ground voltage, taken to be 0 volts, minus a forward voltage drop associated with the diode 165 (i.e., approximately −0.7 volts). This "diode-clamped" voltage can be measured until the current stops running through the diode 165. When the current stops, the voltage at node A rises to a level that is approximately the back-EMF of the motor.

In some embodiments, controller 17 monitors the unfiltered voltage at node A. This node corresponds to the motor lead which is disconnected when the FET 280 is switched off. However, the signal at node A may be somewhat noisy. Therefore, the signal is preferably filtered before being measured. In some embodiments, the filter is similar to that shown as filter 283 in FIG. 5. The filtered signal may be measured at the output of a filter at node B.

Filter 283 (FIG. 5) is an R-C filter which is initialized at approximately ground voltage before the voltage at node B is monitored. When the motor is energized, the controller 17 applies a voltage to the base of transistor 284. This allows current to flow through transistor 284, and capacitor 287 will be in a discharged state. When the motor is de-energized, the controller 17 brings the base of transistor 284 to ground, and transistor 284 stops conducting. At this time, filter 283 acts as a simple R-C filter, with a total resistance equal to the sum of resistors 285 and 286. The time constant of this circuit is preferably smaller than the L/R inductive time constant of the motor 155. In some embodiments, the time constant is less than one tenth of the L/R time constant of the motor 155.

Figure 6A:
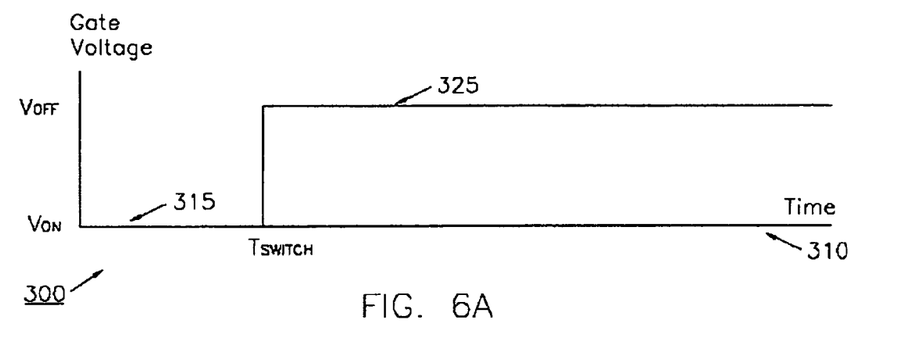
FIG. 6A illustrates a plot of voltage over time at a gate of the field effect transistor shown in FIG. 5 during a single de-energizing event.
Figure 6B:
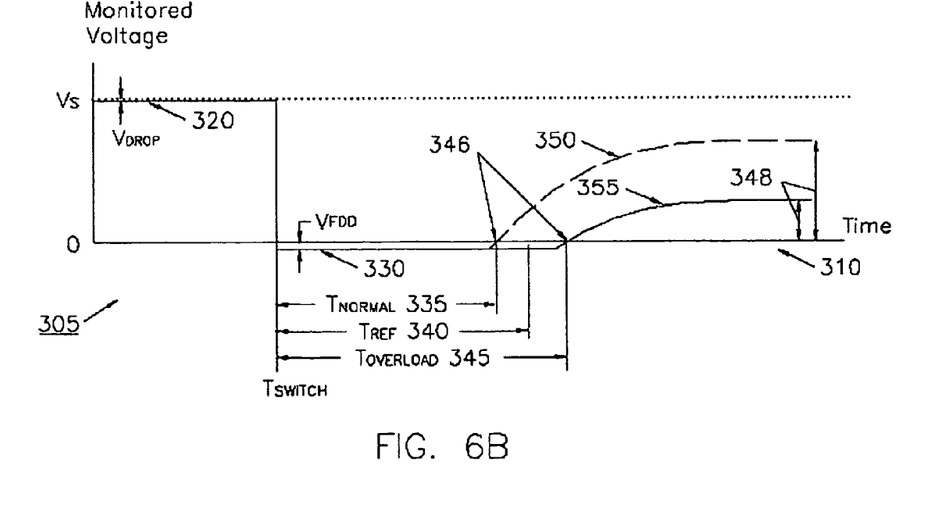
FIG. 6B illustrates a plot of voltage over time at a monitoring point "A" indicated in FIG. 5 during a single de-energizing event.

FIGS. 6A and 6B illustrate exemplary voltage characteristic plots (300 and 305, respectively) of the motor overload detection circuit 275 (FIG. 5). FIG. 6A illustrates a voltage measurement at the gate of the FET 280 over a certain time period 310, while FIG. 6B illustrates a voltage measurement at node A over the same time period 310. This time period 310 corresponds to the time before, and after, a single de-energizing of the motor. When a first voltage 315 is applied to the gate of the FET 280 (e.g., $V_{ON}$), the FET 280 conducts and the motor 155 is energized. Accordingly, as shown in FIG. 6B, a voltage measured at node A differs from the supply voltage by only a fraction of a volt (trace 320). The difference between the voltage measured at node A and the supply voltage is the relatively small voltage ($V_{DROP}$) associated with the resistance of the FET 280, which in some cases is a few milliohms.

Referring back to FIG. 6A, a second voltage 325 (e.g., $V_{OFF}$) is applied to the gate of the FET 280 at time $T_{SWITCH}$. At this time, the FET 280 turns off, effectively de-energizing the motor 155. At the time $T_{SWITCH}$ that the second voltage 325 is applied to the gate of the FET 280, the voltage measured at node A (i.e., the monitored voltage) decreases to a diode-clamped voltage 330, which, as previously described, is approximately equal to minus the forward voltage drop of the diode ($V_{FDD}$), as shown in FIG. 6B.

The current which flows through the diode after the motor 155 is de-energized decays eventually to zero. When there is no longer current flowing through the diode 165, the voltage measured at node A begins to rise from the diode-clamped voltage value 330. Accordingly, the time required for the voltage to begin to rise from the diode-clamped value 330 varies according to the motor load. For example, a relatively large motor load inherently requires a large current to be present in the motor 155. Correspondingly, a longer time period is needed for the voltage to depart from the diode-clamped voltage 330, because motor current flows through the diode 165 for a longer period of time. Likewise, a relatively smaller load requires a shorter time period for the voltage to depart from the diode-clamped voltage 330. Therefore, a longer time period can indicate an overload condition.

FIG. 6B shows three time periods, including ($T_{NORMAL}$) 335, ($T_{REF}$) 340, and ($T_{OVERLOAD}$) 345, which correspond to a normal time period, a reference time period, and an overload time period. The time periods 335–345 are representative of the time that is required for the voltage measured at node A to begin to rise from the diode-clamped voltage 330 and reach a reference voltage (shown by arrows 246), which in the case shown is ground, or zero volts. Dashed line 350 provides an example of a motor that is operating within normal loading parameters, which requires the first or normal time period ($T_{NORMAL}$) 335 for the monitored voltage 330 to rise to zero volts. A motor that is overloaded, on the other hand, requires a relatively longer period of time ($T_{OVERLOAD}$) 345 for the monitored voltage 330 to rise to zero volts, as shown with solid line 355. The reference time period ($T_{REF}$) 340 can correspond to, for example, the limiting criterion for determining if the motor is in an overload condition.

The voltage trace shown in FIG. 6B corresponds to the voltage monitored at node A. If the filter 283 is used, the voltage monitored at node B will differ from that of FIG. 6B during the time preceding $T_{SWITCH}$, when it will be equal to ground voltage plus a small transistor voltage drop. After $T_{SWITCH}$, it will approximate that shown in FIG. 6B.

The voltage traces shown in FIGS. 6A and 6B correspond to a single de-energizing event, showing the behavior of the gate voltage of the FET 280 and the monitored voltage 230 in the event that the motor is not re-energized. The solid line 355 shown in FIG. 6B corresponds to the actual voltage trace for a motor in an overload condition, since a motor in this condition would in most embodiments not be re-energized. Not shown in FIG. 6B is the eventual change in back-EMF voltage as the motor speed changes. As the motor slows, and eventually stops, the back-EMF value 348 would fall to zero, and the solid trace would gradually approach ground voltage, or 0 volts.

Figure 6C:
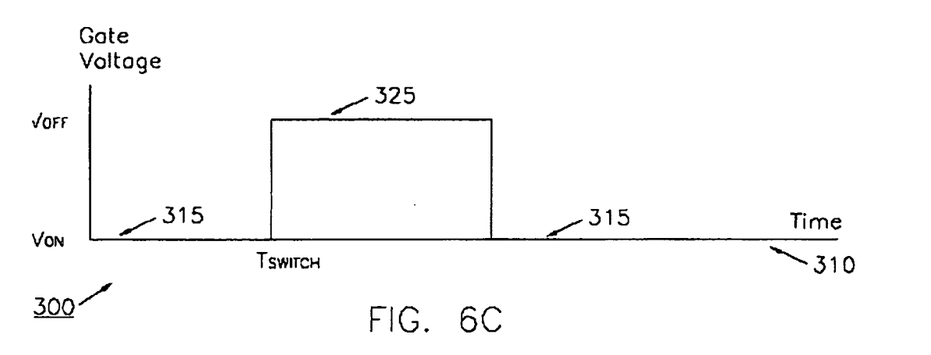
FIG. 6C illustrates a plot of voltage over time at the gate of the field effect transistor shown in FIG. 5 during a de-energizing and re-energizing of the motor in a case of normal loading.
Figure 6D:
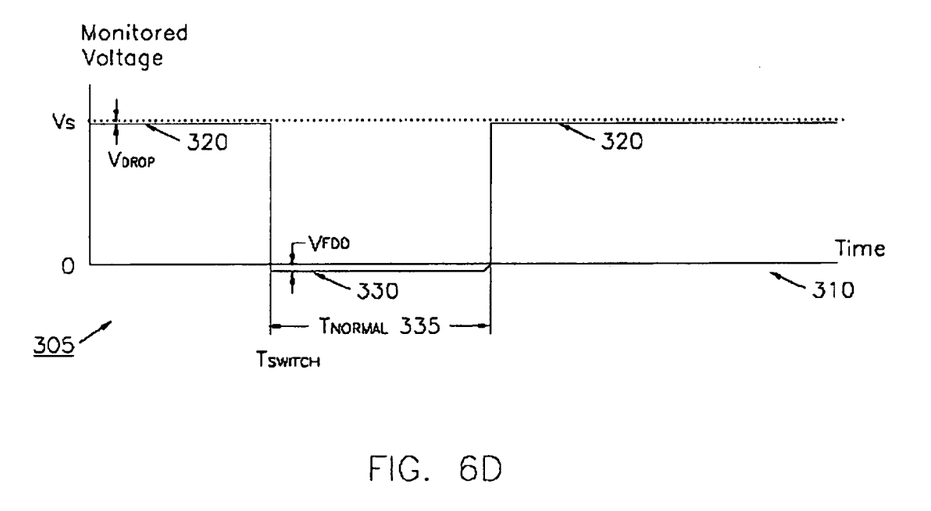
FIG. 6D illustrates a plot of voltage over time at the monitoring point "A" indicated in FIG. 5 during a de-energizing and re-energizing of the motor in a case of normal loading.

FIGS. 6C and 6D show the traces of the gate voltage (of the FET 280) and the monitored voltage 330 for a motor under normal loading conditions, including both the de-energizing event shown in FIGS. 6A and 6B, and a re-energizing event. When the controller 17 detects that the monitored voltage 330 crosses the reference voltage (in this example equal to ground, or 0 volts) within a time $T_{NORMAL}$ which is less than the reference time $T_{REF}$, as shown by the dashed curve 350 in FIG. 6B, it determines that the motor is in a normal loading condition, and it therefore re-energizes the motor. To do this it applies voltage $V_{ON}$ to the gate of the FET 280, and the FET 280 is returned to the conducting state. The monitored voltage again rises to the supply voltage $V_S$ minus a small value $V_{DROP}$ corresponding to the resistance of the FET 280. This sequence of events, consisting of a de-energizing of the motor, a monitoring of the voltage at node A, a timing of the crossing of this voltage and a reference voltage, and a re-energizing of the motor, will be repeated at regular intervals as long as the motor 155 is found to be in a normal loading condition.

The switching characteristics as shown in FIGS. 4A, 4C, 6A and 6C may vary according to the configuration of the FETs 160 and 280. Therefore, different amounts of voltage could be used for the first and second voltages 215, 315 and 225, 325. For example, an N-channel FET can be used as a high-side switch if a charge-pump is used to increase the gate voltage beyond the supply voltage. As shown in FIG. 4A, the gate voltage 215 that switches the FET 160 on exceeds the voltage 225 that switches the FET off.

Figure 7:
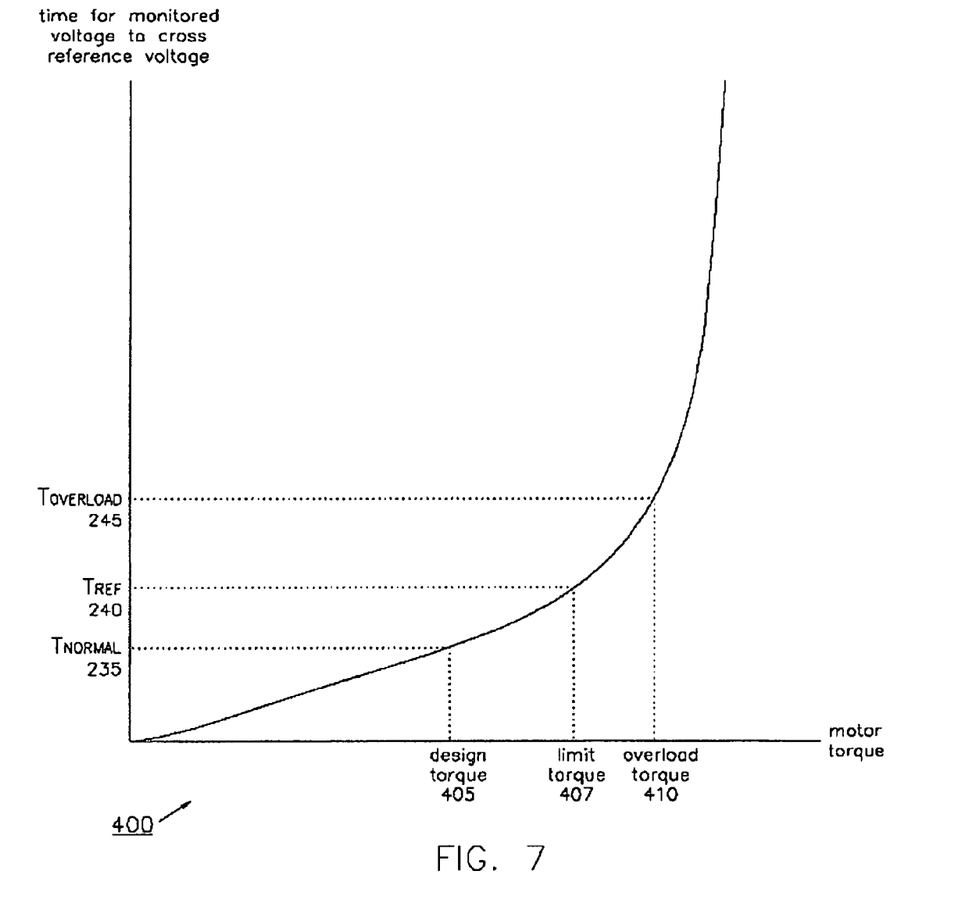
FIG. 7 illustrates a plot of motor torque vs. time for a monitored voltage to cross a reference voltage.

FIG. 7 illustrates a torque curve 400 that is representative of the relationship between a torque of the motor 155 and the defined time periods 235–245 of FIG. 4B. In another embodiment, another torque curve (not shown) that is similar to the torque curve 400 can be constructed to represent the relationship between a torque of the motor 155 and the defined time periods 335–345 of FIG. 6B. The torque curve 400 is generally non-linear. As shown in FIG. 4B, the normal time period ($T_{NORMAL}$) 235 and overload time period ($T_{OVERLOAD}$) 245 correspond to a design motor torque 405 and an overload motor torque 410, respectively. In some embodiments, the design torque 405 is a nameplate torque value, or more simply the torque that the motor 155 produces under normal operating conditions. The overload torque 410, alternatively, represents the amount of torque that can cause the motor 155 to fail. For example, if the motor 155 produces the overload torque 410 for a period of time, the temperature of the motor 155 rises, which causes damage to the components of the motor 155. If enough damage is caused, the motor 155 fails. The reference time ($T_{REF}$) 240 corresponds to a limiting motor torque 407. Torque values less than this value may exceed the design torque 405, but will not damage the motor 155.

Various embodiments are set forth in the following claims.

What is claimed is:

1. A method of monitoring a load of a DC motor having a plurality of leads, the method comprising:
   initially energizing the motor, and
   performing repetitively a sequence of actions, each sequence of actions being separated by a first interval of time, each sequence of actions comprising:
   de-energizing the motor by interrupting a flow of current through one of the plurality of leads;
   monitoring a first voltage; and
   measuring a second interval of time between a starting time and an ending time, wherein the starting time comprises the time at which the motor is de-energized and the ending time comprises a time at which the first voltage and a reference voltage have substantially similar values.

2. The method of claim 1, wherein the time at which the first voltage and the reference voltage have substantially similar values is indicative of the time that current ceases to flow through the motor.

3. The method of claim 1, wherein the actions further comprise:
comparing the second interval of time with a reference interval of time; and
determining whether the motor is in an overload condition based on the second interval of time, where a time interval longer than the reference interval of time is interpreted as an overload condition and a time interval shorter than the reference interval of time is interpreted as a normal condition.

4. The method of claim 3, wherein the actions further comprise:
re-energizing the motor if the motor is in a normal condition; and
keeping the motor de-energized if the motor is in an overload condition.

5. The method of claim 3, wherein the actions further comprise:
re-energizing the motor if the motor is in a normal condition; and
re-energizing the motor after a third interval of time if the motor is in an overload condition.

6. The method of claim 3, further characterized in that the first interval of time is shorter than the time it takes for an overload condition to permanently damage the motor.

7. The method of claim 3, wherein a fourth interval of time is the interval of time between the initial energizing of the motor and an earliest occurrence of the sequence of actions, and the fourth interval is adequate for the motor to accelerate to substantially its steady speed, but shorter than the time it takes for an overload condition to permanently damage the motor.

8. The method of claim 5, wherein a fourth interval of time is the interval of time between the initial energizing of the motor and an earliest occurrence of the sequence of actions, and the fourth interval is adequate for the motor to accelerate to substantially its steady speed, but shorter than the time it takes for an overload condition to permanently damage the motor and wherein the third interval of time is at least 5 times the fourth interval of time.

9. The method of claims 7 or 8, wherein the fourth interval of time is smaller than the first interval of time.

10. The method of claim 2, wherein the first voltage is indicative of the voltage of the interrupted motor lead.

11. The method of claim 10, wherein the first voltage is the output of a filter the input of which is the voltage of the interrupted motor lead.

12. The method of claim 10, wherein the reference voltage is approximately equal to the voltage of the non-interrupted motor lead.

13. A motor load monitoring system configured to monitor a DC motor having a first motor lead and a second motor lead, the first and second motor leads configured to be coupled to a power supply, the system comprising:
a switch configured to be coupled between the power supply and the first motor lead;
a fly-back current path between the first motor lead and the second motor lead; and
a controller configured to be coupled to the switch, to receive a monitored voltage, to intermittently de-energize the motor by controlling the switch, and to measure an interval of time between a starting time and an ending time, wherein the starting time comprises a time at which the motor is de-energized and the ending time comprises a time at which the monitored voltage and a reference voltage have substantially similar values.

14. The load monitoring system of claim 13, wherein the time at which the monitored voltage and the reference voltage have substantially similar values is indicative of the time that current ceases to flow through the fly-back path.

15. The load monitoring system of claim 13, wherein the monitored voltage is indicative of the voltage at the first motor lead.

16. The load monitoring system of claim 13, further comprising a filter coupled to the first motor lead and wherein the monitored voltage comprises a voltage at an output of the filter.

17. The load monitoring system of claim 15, wherein the reference voltage is approximately equal to the voltage at the second motor lead.

18. The load monitoring system of claim 13, wherein the motor is a brushed, or mechanically commutated, DC motor.

19. The load monitoring system of claim 13, wherein the first lead is a low-voltage lead.

20. The load monitoring system of claim 13, wherein the first lead is a high-voltage lead.

21. The load monitoring system of claim 13, wherein the switch is a transistor.

22. The load monitoring system of claim 13, wherein the switch is also used for speed control.

23. The load monitoring system of claim 22, in which the speed control is of the pulse-width modulation type.

24. The load monitoring system of claim 13, wherein the fly-back current path comprises a diode.

25. The load monitoring system of claim 13, wherein the fly-back current path comprises a transistor.

26. The load monitoring system of claim 13, wherein the controller is a programmable device.

27. An automotive, engine-cooling system comprising:
a motor having a first motor lead and a second motor lead, the first and second motor leads configured to be coupled to a power supply;
a switch configured to be coupled between the power supply and the first motor lead;
a fly-back current path between the first motor lead and the second motor lead; and
a controller configured to be coupled to the switch, to receive a monitored voltage, to intermittently de-energize the motor by controlling the switch, and to measure an interval of time between a starting time and an ending time, wherein the starting time comprises a time at which the motor is de-energized and the ending time comprises a time at which the monitored voltage and a reference voltage have substantially similar values.

28. The system of claim 27, wherein the monitored voltage is indicative of the voltage at the first motor lead.

29. The system of claim 27, further comprising a filter coupled to the first motor lead and wherein the monitored voltage comprises a voltage at an output of the filter.

30. The system of claim 28, wherein the reference voltage is approximately equal to the voltage of the second motor lead.

31. The system of claim 27, wherein the motor is a brushed, or mechanically commutated, DC motor.

32. The system of claim 27, wherein the switch is a transistor.

33. The system of claim 27, wherein the switch is also used for speed control.

34. The system of claim 33, in which the speed control is of the pulse-width modulation type.

35. The system of claim 27, further comprising a fan connected to the motor.

* * * * *